US011198465B2

(12) United States Patent
Genet et al.

(10) Patent No.: US 11,198,465 B2
(45) Date of Patent: Dec. 14, 2021

(54) MODULAR ENERGY-ABSORBING DEVICE

(71) Applicant: ROBERT BOSCH AUTOMOTIVE STEERING VENDÔME, Vendome (FR)

(72) Inventors: Nicolas Genet, Coulommiers la Tour (FR); Alexis De Weer, Vendome (FR); Thomas Jorigne, Cande sur Beuvron (FR); Alain Jollet, Naveil (FR); Benjamin Thomas, Saint Anne (FR); Stéphane Thebault, Aze (FR)

(73) Assignee: ROBERT BOSCH AUTOMOTIVE STEERING VENDÔME, Vendome (FR)

( * ) Notice: Subject to any disclaimer, the term of this patent is extended or adjusted under 35 U.S.C. 154(b) by 0 days.

(21) Appl. No.: 16/971,119

(22) PCT Filed: Mar. 21, 2019

(86) PCT No.: PCT/FR2019/050651
§ 371 (c)(1),
(2) Date: Aug. 19, 2020

(87) PCT Pub. No.: WO2019/186034
PCT Pub. Date: Oct. 3, 2019

(65) Prior Publication Data
US 2021/0094605 A1 Apr. 1, 2021

(30) Foreign Application Priority Data
Mar. 26, 2018 (FR) ...................................... 1852604

(51) Int. Cl.
*B62D 1/19* (2006.01)
*B62D 1/184* (2006.01)
(Continued)

(52) U.S. Cl.
CPC ............. *B62D 1/192* (2013.01); *B62D 1/184* (2013.01); *B62D 1/185* (2013.01); *F16F 7/123* (2013.01); *F16F 7/125* (2013.01); *F16F 7/128* (2013.01)

(58) Field of Classification Search
CPC .......... B62D 1/195; B62D 1/192; B62D 1/19; B62D 1/184; B62D 1/185; F16F 7/123; F16F 7/125; F16F 7/128; F16F 7/12
(Continued)

(56) References Cited

U.S. PATENT DOCUMENTS 9,428,215 B1\* 8/2016 Nagatani ................ B62D 1/195
2005/0012316 A1 1/2005 Ben Rhouma
(Continued)

FOREIGN PATENT DOCUMENTS

DE 102015115923 A1 3/2017
EP 1728703 A2 12/2006
(Continued)

OTHER PUBLICATIONS

International Search Report for corresponding application PCT/FR2019/050651 filed Mar. 21, 2019; dated Jul. 24, 2019.

*Primary Examiner* — Keith J Frisby
(74) *Attorney, Agent, or Firm* — Cantor Colburn LLP

(57) ABSTRACT

The present invention relates to a modular energy absorption device (9) comprising:
  a support (91) having fastening portions (81) forming single fastening points for fastening said device to a steering column,
  a deforming member (94) securely connected to the support,
  an absorber (93) coiled around the deforming member and fitted securely at each of its ends to the support, (Continued)

a coupling member (96) formed of a part separate from the support and having a first side securely connected to the absorber and a second side having at least a first engaging shape (96*a*), said device being designed such that the exertion of forces in opposite directions on the support and on the tooth, respectively, brings about stress on the coiled portion of the absorber, tending to deform the latter.

11 Claims, 5 Drawing Sheets

(51) Int. Cl.
    *B62D 1/185*      (2006.01)
    *F16F 7/12*      (2006.01)

(58) Field of Classification Search
     USPC .......................... 280/775, 777, 779; 74/493
     See application file for complete search history.

(56) References Cited

U.S. PATENT DOCUMENTS

| | | |
|---|---|---|
| 2005/0189757 A1 | 9/2005 | Li |
| 2007/0013180 A1* | 1/2007 | Stuedemann .......... B62D 1/184 280/775 |
| 2008/0238071 A1 | 10/2008 | Oh |
| 2015/0375773 A1 | 12/2015 | Tinnin |
| 2016/0368524 A1* | 12/2016 | Tinnin ................... B62D 1/192 |
| 2018/0009463 A1* | 1/2018 | Yoshihara .............. B62D 1/185 |
| 2018/0208233 A1* | 7/2018 | Kwon .................... B62D 1/185 |

FOREIGN PATENT DOCUMENTS

| | | |
|---|---|---|
| EP | 1728703 A3 | 12/2006 |
| FR | 2775647 A1 | 9/1999 |
| WO | 2009147325 A1 | 12/2009 |

\* cited by examiner

MODULAR ENERGY-ABSORBING DEVICE

The present invention relates to the field of vehicle steering columns. More particularly, the present invention relates to an energy absorption device intended to be mounted on a steering column and designed to absorb energy in the event of a frontal impact of the vehicle.

The majority of current motor vehicles are equipped with a system for absorbing energy in the event of a frontal impact. Depending on the different energy values to be absorbed and the absorption time that are desired, certain components are specific to each vehicle and require adaptations to the surrounding components and to the assembly and inspection tools. This results in a large number of components and tools for different vehicles.

Furthermore, on a single vehicle, the requirements in terms of frontal impact may differ from region to region or from one version of the same vehicle to another, resulting in as many different specifications, for example in terms of energy level to be absorbed. As a result, a different energy absorption system is generally designed for each of the specifications.

The technical problem to be solved by the invention is therefore that of further optimizing the production of energy absorption systems for different vehicles and/or steering columns, or with different variants.

To this end, a first subject of the invention is an energy absorption device comprising:
  a support having fastening portions intended to allow the support to be fastened to a steering column,
  a deforming member securely connected to the support,
  an energy absorption member, hereinafter absorber, made up of a plastically deformable part separate from the support, coiled around the deforming member and securely fitted at each of its ends to the support,
  a coupling member formed of a part separate from the support and having a first side securely connected to the absorber and a second side having at least a first engaging shape, in particular a tooth.

This absorption device is designed in such a way:
that the exertion of forces in opposite directions on the support and on said engaging shape, respectively, brings about stress on the coiled portion of the absorber, tending to deform the latter,
that a module is formed in which the support, the deforming member, the absorption member and the coupling member are joined together independently of said fastening portions such that the latter form the only means for fastening said absorption device to a steering column.

Thus, the energy absorption device is modular and can be assembled fully before it is mounted on the steering column. The support ensures that all of the elements of the absorption device according to the invention are secured, before it is mounted, and then once it is mounted on the steering column.

Therefore, at least the support can be a standard part maintained for different vehicles. Depending on the different specifications of each vehicle, whether it is a matter of different models or variants of a single model, the absorber will be designed differently. The cost and production constraints of this absorption device are thus reduced.

The invention may optionally have one or more of the following features:
  said deformation takes place along a deformation axis and the support is a profile section extending along this deformation axis and having a cross section transverse to this deformation axis; it is thus possible to create different standard supports if necessary, the different lengths of which can thus be adapted as desired without changing the interfaces, in particular the fastening portions, the main functions or the performance aspects thereof, thereby maintaining a standard definition for these different standard supports; therefore, the design of different standard supports is nevertheless simplified;
  the support, the deforming member, the absorber and the coupling member are separate parts from one another; this support thus also makes it possible to receive modular components formed by the deforming member, the absorber and the coupling member; for example, the support and the coupling member may be standard, and the absorber and the deforming member may be adapted to the different absorption specifications required;
  the device comprises a fusible member that fastens one of the ends of the absorber to the support and is designed to break under a given force on the coupling member;
  the fastening portions are lateral flanges that are pierced so as to receive screws for fastening to a steering column;
  the coupling member is joined to the absorber in a manner trapped by crimping;
  the device comprises an initial-deformation element fastened to the support and arranged at a distance from said deforming member, the absorber comprising a first loop coiled around said initial-deformation part and a second loop coiled around said deforming member;
  according to the preceding paragraph, the device may comprise an activatable pyrotechnic element designed to release said initial-deformation element such that said stress is then exerted on the deforming member;
  the connection between the absorber and the coupling member is elastic;
  the support comprises one or more grooves for guiding the absorber.

Another subject of the invention is a steering column comprising:
  a lower base that is intended to be connected to the chassis of a vehicle and comprises clamping walls,
  an upper tube arranged between these clamping walls so as to be able to slide with respect to said lower base in order not only to allow adjustment of the depth of a steering wheel intended to be connected to the upper tube but also to allow the upper tube and the lower base to slide with respect to one another in the event of a frontal impact,
  a clamping mechanism designed to close the clamping walls towards one another so as to immobilize the upper tube in the lower base,
  a gearing member fastened to the upper tube with a plurality of teeth or holes that are aligned in a direction parallel to the sliding axis of the upper tube with respect to the lower base,
  a device according to the invention, which is fastened to the lower base via its fastening portions, the coupling member being movable between an engaged position, in which it is meshed with the plurality of teeth or holes, and a disengaged position, in which it is disengaged from the plurality of teeth or holes;
  an engaging mechanism designed to be able to move the coupling member from one of the engaged and disengaged positions to the other.

In the example illustrated, the terms "top", "bottom", "under", "above", "beneath", "lower", "upper", "front", "rear", "in front", "behind", "vertical", "horizontal", "transverse" relate, unless indicated otherwise, to the orientation of the device according to the invention or of the steering column according to the invention that they are intended to have once mounted in a vehicle.

Further features and advantages of the invention will become apparent from reading the detailed description of the following nonlimiting examples, for an understanding of which reference will be made to the appended drawings, in which.

Figure 1:
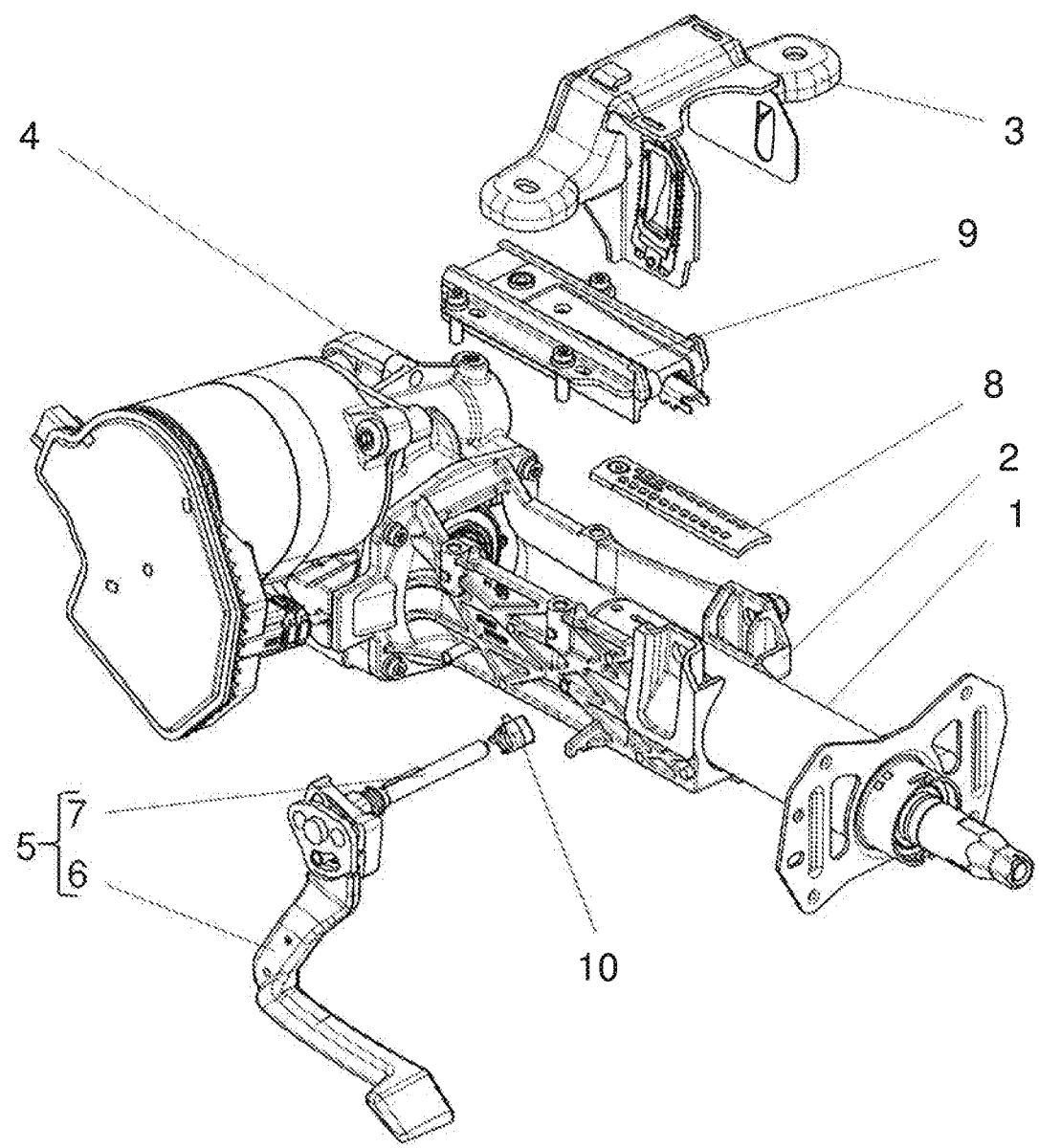
FIG. 1 is an exploded view of a steering column according to the invention.
Figure 2:
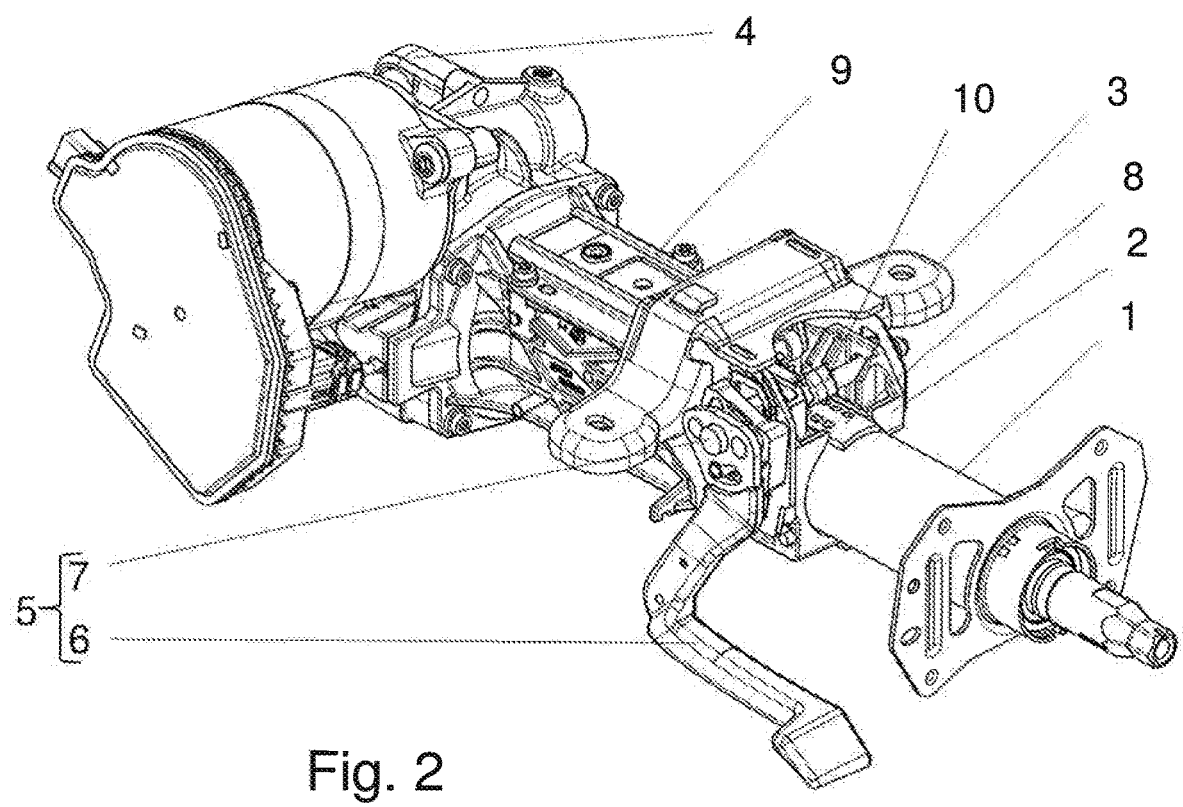
FIG. 2 shows a perspective view of the column from FIG. 1 in an assembled state.

FIGS. 1 and 2 illustrate a steering column comprising an upper tube 1 that slides with respect to a lower base 2, thereby making it possible to adjust the depth of the steering wheel and the necessary travel in the event of a frontal impact.

In this case, the lower base 2 comprises two clamping walls, the internal surfaces of which form a tube receiving the upper tube 1. The base will be referred to hereinafter as lower tube 2, on account of the internal shape of its clamping walls.

These tubes 1, 2 are connected to the structure of the vehicle by an upper lug 3 and a pivot lug 4. A clamping mechanism 5 makes it possible to immobilize the column by friction in the chosen adjustment position. This mechanism comprises a lever 6 joined to a clamping screw 7.

A gearing member 8 has a plurality of teeth or holes, in this case holes, and is fastened to the upper tube 1. Depending on the specifications of the different vehicles, the number of teeth or holes can vary.

The steering column also comprises an energy absorption device 9 according to a first embodiment according to the invention.

This absorption device 9 is modular according to the invention.

Figure 3:
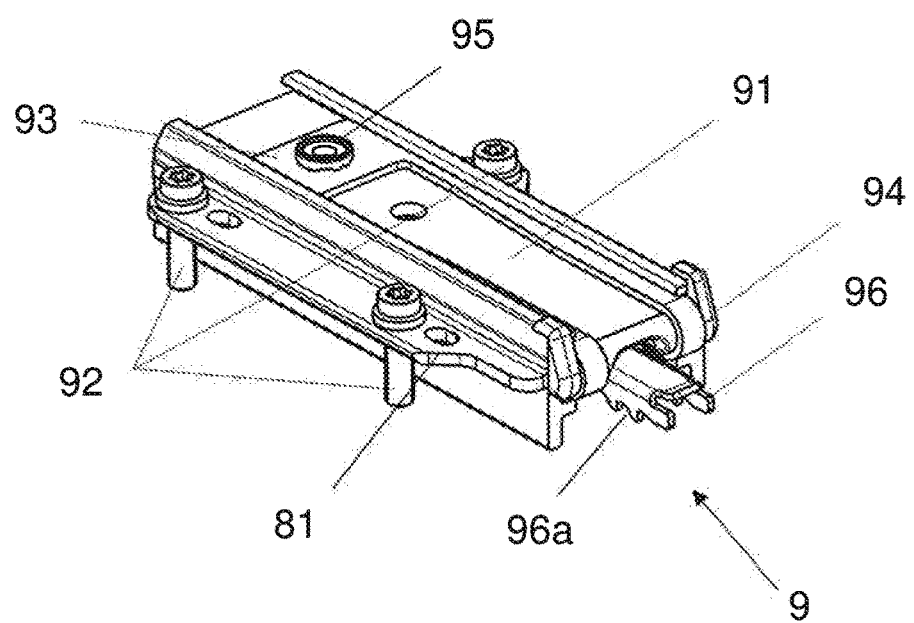
FIG. 3 is a perspective view of an absorption device according to a first embodiment of the invention, in this case the device from FIG. 1.
Figure 4:
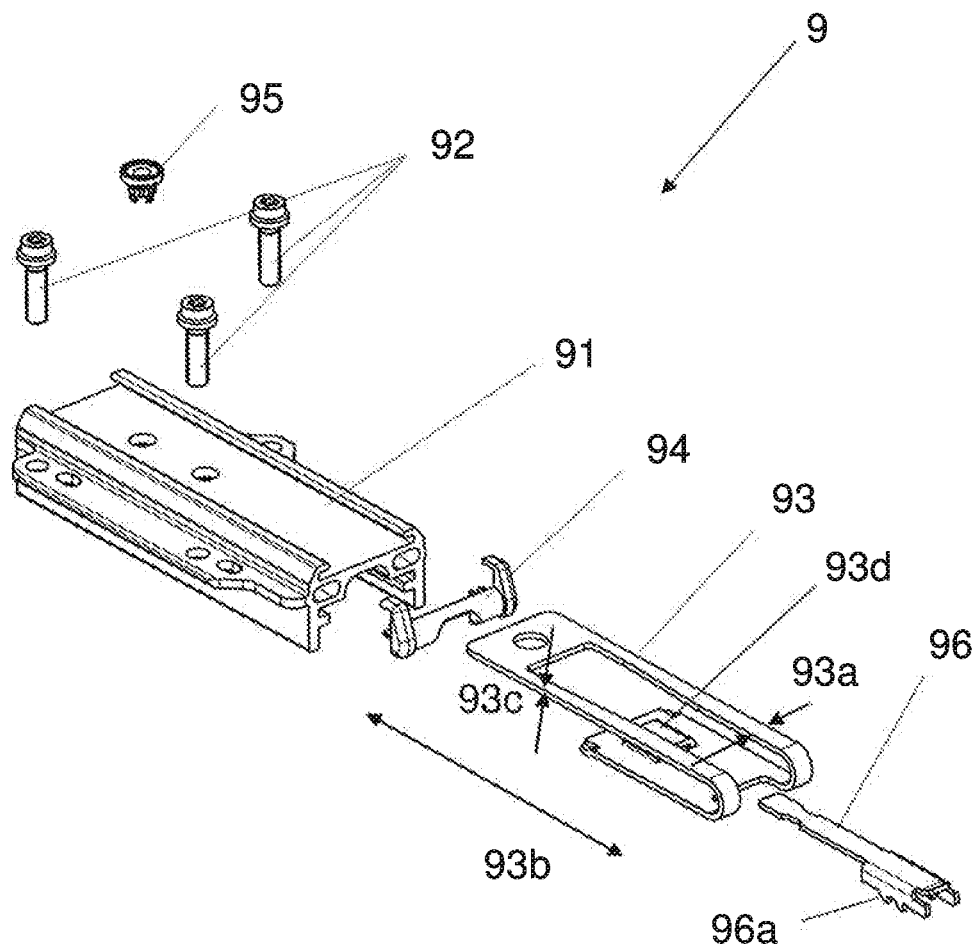
FIG. 4 is an exploded view of FIG. 3.

As illustrated in FIGS. 3 and 4, said absorption device 9 is in this case made up of a support 91 allowing quick connection, via fastening portions 81, to the rest of the column with the aid of fastening screws 92 on the lower tube 2.

According to variants that are not shown, the support 91 can also or alternatively be fastened by crimping, riveting, adhesive bonding or a tight fit.

The support 91 is in this case embodied by a profile section.

This profile section extends along a deformation axis provided during a frontal impact of the vehicle. This axis is parallel to the longitudinal axis of the upper tube. The profile section has a cross section transverse to this deformation axis.

This profile section can be made of metal, plastic, or composite material. It can be produced in particular by extrusion, stamping or moulding.

The fastening portions are in this case formed by flanges 81, in this case cut out of the profile section and pierced so as to receive the fastening screws 92.

This support 91 in this case receives the following modular components:

an absorption member, hereinafter absorber 93, a deforming member, hereinafter uncoiler 94, a coupling member, hereinafter axial rack 96, comprising at least a first engaging shape, in this case at least four engaging shapes 96a, in this case each formed by a tooth 96a, and a fusible peg 95 that is breakable in order to be sheared under a given load, in particular in the event of a frontal impact, this fusible peg 95 fastening one of the ends of the absorber 93 to the support 91.

These components 93, 94, 95, 96 are said to be modular since they are each formed of separate parts that are fitted together to form the absorption device 9.

The absorber 93 is made of a plastically deformable part that is separate from the support 91, coiled around the uncoiler 94 and securely fitted at one of its ends to the support 91, in each case via the fusible peg 95, the other end being fastened to the axial rack 96.

As illustrated in FIG. 4, this device is modular in terms of the following functions:

Perfect separation of the assembly of the energy absorption elements with respect to the rest of the steering column; this separation makes it possible, if necessary, to isolate the assembly of the subassembly and make it standard for several projects; it is then able to be integrated into the complete system by a quick fastener of the screw 92 type, as here;

The support 91 is a standard element, formed in particular from a profile section;

The absorber 93 can be varied, depending on the specifications required by the vehicle for which it is intended, in terms of its material, notably metal, its cross section(s) 93a, its length 93b, its thickness 93c and its radius of curvature around the uncoiler 94; in this case, it is formed in particular by a cut and coiled metal sheet having this thickness 93c;

The uncoiler 94 can also be varied in terms of its radius of curvature and thus be associated with the absorber 93 in order to be adapted to said specifications;

The fusible peg 95, made in particular of plastic, can be varied in terms of its cross section, its position on the subassembly or its absence in order to meet these specifications;

The axial rack 96 is in this case also a standard element and is joined to the absorber 93 in a manner trapped by crimping, allowing a quick connection operation, of the crimping type, making it possible to connect the axial rack 96 to a large number of absorber variants having the same connection interface 93d.

The axial rack 96 is in this case made of spring material, as a result directly incorporating the automatic gearing system in an engaged position even in a tooth on tooth situation, as will be described below.

The support 91 incorporates one or more grooves for guiding the absorber 93. This makes it possible to optimize the stability of the energy absorption level and also to control the position of the absorber 93 during uncoiling, in order to avoid any contact with exterior elements.

It is in this case possible to connect the uncoiler 94 to the support 91 and thus, from a concept having two distinct elements, to select the desired variant. Alternatively, it is possible to design the support 91 in one piece, in particular moulded, incorporating the uncoiler 94.

Finally, the advantage of the invention is to isolate a subassembly, namely the module forming the energy absorption device, the specifications of which may be manifold, and thus alleviate the complexity on the main assembly line. The advantage is also to profit from this isolation to make it possible to define this subassembly as a standard in which minor adaptations can be incorporated while remaining compatible with the assembly stations of this subassembly. As a result of its standardization, this element can be used as desired on several projects in parallel.

All of these advantages result directly in an increase in economic performance across the components, by virtue of a larger volume, optimization of the overheads, by virtue of assembly and control means that are shared across several projects and for a longer period, but also optimization of the resources necessary for monitoring and producing the product, by virtue of better knowledge of the product and the methods for producing it.

As illustrated in FIGS. 1, 2 and 5a to 5e, a cam 10 is also joined to the clamping screw 7 and forms an engaging mechanism for engaging or disengaging the axial rack 96 to/from the gearing member 8.

Figure 5A:
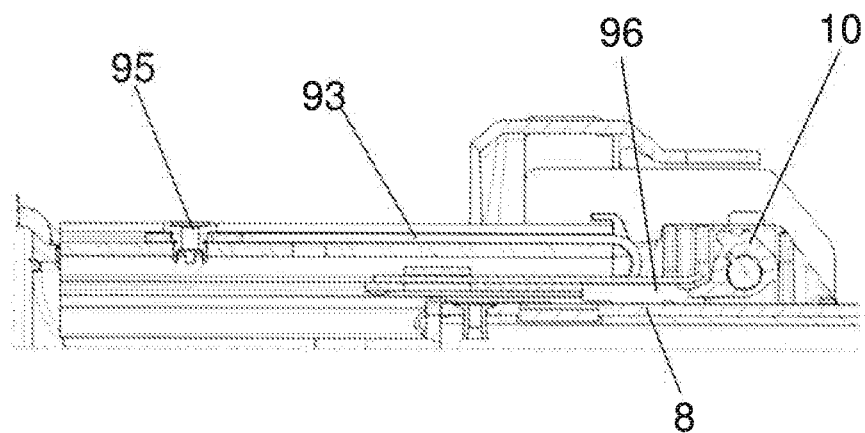
FIGS. 5a to 5e show a longitudinal section through the device from FIG. 3, passing through the middle thereof, in different situations.

FIG. 5a illustrates the meshing of the axial rack 96 in the gearing member 8 when the absorption device 9 is mounted on the lower tube 2, in the engaged position. The upper tube 1 is thus prevented from moving in the lower tube 2 by clamping, and the teeth of the axial rack 96 are engaged in the holes in the absorption device 9. The cam 10 can be seen here.

Figure 5B:
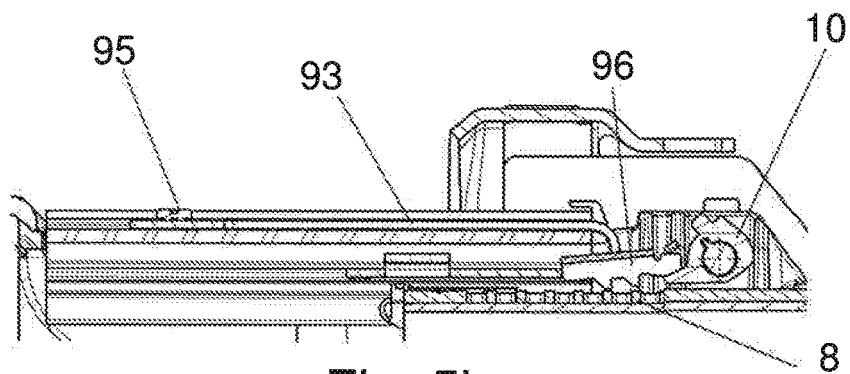
Figure 5C:
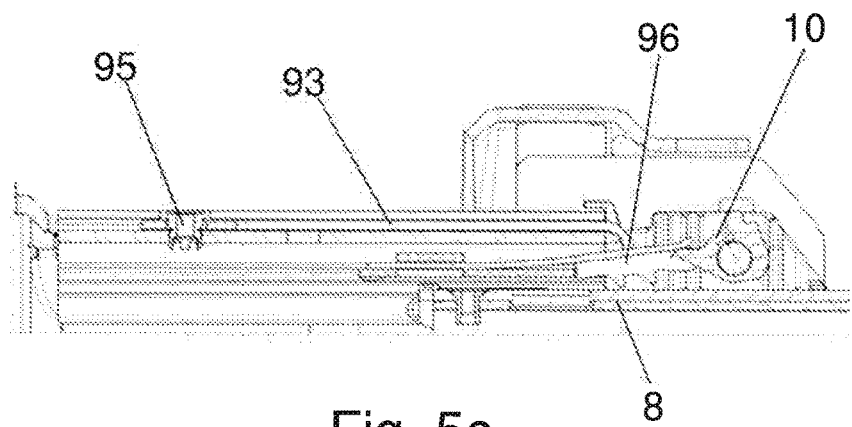

In order to adjust the position of the steering wheel, the user actuates the lever 6, driving the cam 10 into the disengaged position: the gearing system is then deactivated, as illustrated in FIG. 5c. The upper tube 1 can then slide in the lower tube 2.

Once adjustment has been carried out, the actuation of the lever 6 in the opposite direction drives the cam 10 in the opposite direction, and the axial rack 96 engages in the gearing member 8 again.

In the case of tooth on tooth meshing, as illustrated in FIG. 5b, or in this case positioning of the teeth 96a of the axial rack 96 against the strips separating each hole in the gearing member 8, the elastic property of the connection of this rack 96 to the absorber 93 allows automatic complete meshing in the event of an impact, the teeth sliding into the holes.

In the event of a frontal impact, forces are exerted in opposite directions on the support 91 and on the teeth of the axial rack 96, respectively, bringing about stress in the coiled portion of the absorber 93, tending to deform the latter. This deformation makes it possible to absorb at least some of the energy of a frontal impact of the vehicle.

Figure 5D:
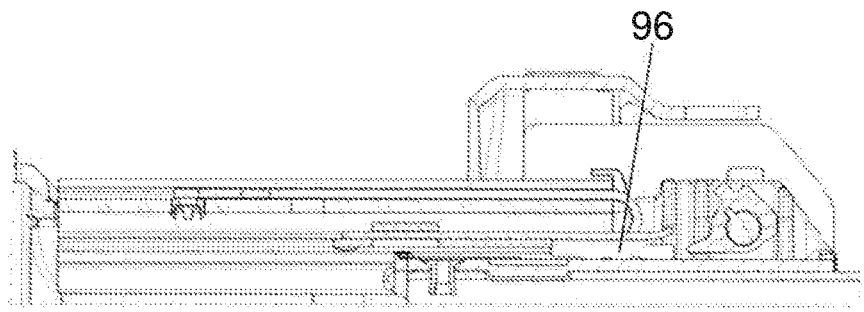
Figure 5E:
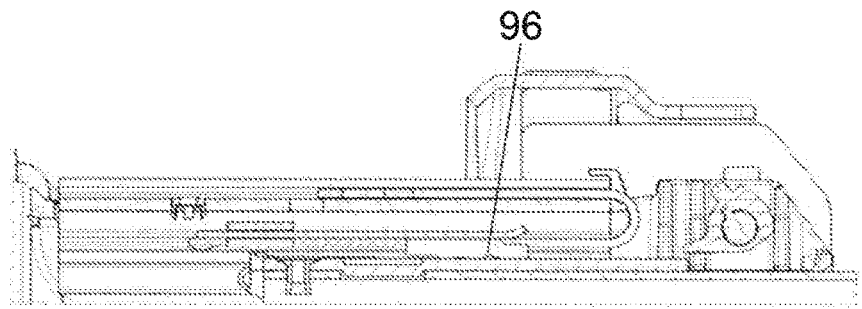

In the example illustrated, at the start of the impact, this deformation will cause the shearing of the fusible peg 95, as illustrated in FIG. 5d. The corresponding end of the absorber 93, which was fastened to the support 91, is then completely free. The deformation is continued by uncoiling to a greater or lesser extent depending on the impact, as can be seen in FIG. 5d. During uncoiling, the metal sheet forming the absorber 93 is guided in the grooves of the support.

Figure 6:
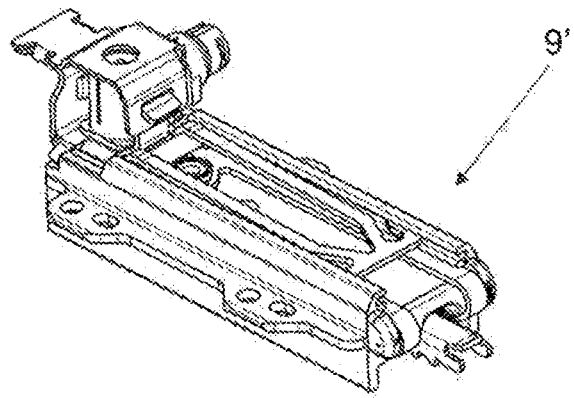
FIG. 6 is a perspective view of an absorption device according to a second embodiment of the invention.
Figure 7:
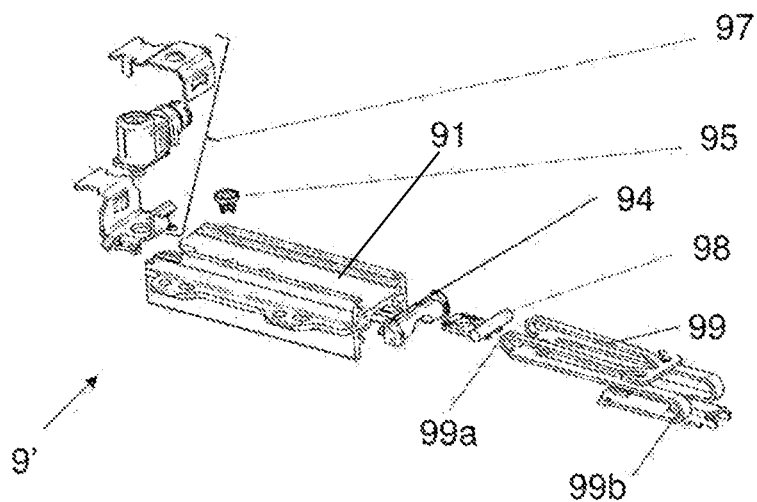
FIG. 7 is an exploded view of FIG. 6.

According to a second embodiment, illustrated in FIGS. 6 and 7, the support 91 can incorporate a multiple uncoiling absorber 99.

The absorption device 9' is in this case made up of an absorber 99 having a double level of effort. With the aid of a pyrotechnic system 97 and a second uncoiler 98, the absorber 99 can then be forced into double uncoiling, allowing a high absorption energy.

If the pyrotechnic system 97 is activated, the second uncoiler 98 is released and thus moves in translation on its support 91. The absorber 99 then uncoils in the manner of a single uncoiling absorber. This makes it possible to adapt the level of absorption to the situation detected by the vehicle.

Otherwise, the device 9' of the second embodiment has similar features to those of the first embodiment. The description of the latter, apart from the features described in the preceding three paragraphs, can thus apply to the second embodiment.

Note that, in the examples illustrated, the teeth are carried by the coupling member, which meshes with holes in the gearing member 8. In variants that are not shown, it is possible to switch: the coupling member then bears the holes, which are coupled with the teeth of the gearing member.

The invention claimed is:
1. Energy absorption device comprising:
   a support having fastening portions intended to allow the support to be fastened to a steering column,
   a deforming member securely connected to the support,
   an energy absorption member, hereinafter absorber, made up of a plastically deformable part separate from the support, coiled around the deforming member and securely fitted at each of its ends to the support,
   a coupling member formed of a part separate from the support and having a first side securely connected to the absorber and a second side having at least a first engaging shape,
   said absorption device being designed in such a way:
   that the exertion of forces in opposite directions on the support and on said first engaging shape, respectively, brings about stress on the coiled portion of the absorber, tending to deform the latter,
   that a module is formed in which the support, the deforming member, the absorption member and the coupling member are joined together independently of said fastening portions such that the latter form the only means for fastening said absorption device to a steering column.

2. Device according to claim 1, wherein said deformation takes place along a deformation axis and the support is a profile section extending along this deformation axis and having a cross section transverse to this deformation axis.

3. Device according to claim 1, wherein the support, the deforming member, the absorber and the coupling member are separate parts from one another.

4. Device according to claim 1, comprising a fusible member that fastens one of the ends of the absorber to the support and is designed to break under a given force on the coupling member.

5. Device according to claim 1, wherein the fastening portions are lateral flanges that are pierced so as to receive screws for fastening to a steering column.

6. Device according to claim 1, wherein the coupling member is joined to the absorber in a manner trapped by crimping.

7. Device according to claim 1, comprising an initial-deformation element fastened to the support and arranged at a distance from said deforming member, the absorber comprising a first loop coiled around said initial-deformation part and a second loop coiled around said deforming member.

8. Device according to claim 7, comprising an activatable pyrotechnic element designed to release said initial-deformation element such that said stress is then exerted on the deforming member.

9. Device according to claim 1, wherein the connection between the absorber and the coupling member is elastic.

10. Device according to claim 1, wherein the support comprises one or more grooves for guiding the absorber.

11. Steering column comprising:
- a lower base that is intended to be connected to the chassis of a vehicle and comprises clamping walls,
- an upper tube arranged between these clamping walls so as to be able to slide with respect to said lower base in order not only to allow adjustment of the depth of a steering wheel intended to be connected to the upper tube but also to allow the upper tube and the lower base to slide with respect to one another in the event of a frontal impact,
- a clamping mechanism designed to close the clamping walls towards one another so as to immobilize the upper tube in the lower base,
- a gearing member fastened to the upper tube with a plurality of teeth or holes that are aligned in a direction parallel to the sliding axis of the upper tube with respect to the lower base,
- a device according to claim 1, which is fastened to the lower base via its fastening portions, the coupling member being movable between an engaged position, in which it is meshed with the plurality of teeth or holes, and a disengaged position, in which it is disengaged from the plurality of teeth or holes;
- an engaging mechanism designed to be able to move the coupling member from one of the engaged and disengaged positions to the other.

* * * * *